July 27, 1954
J. LAIBOW
2,685,020
INSECTICIDE VAPORIZER
Filed July 28, 1952
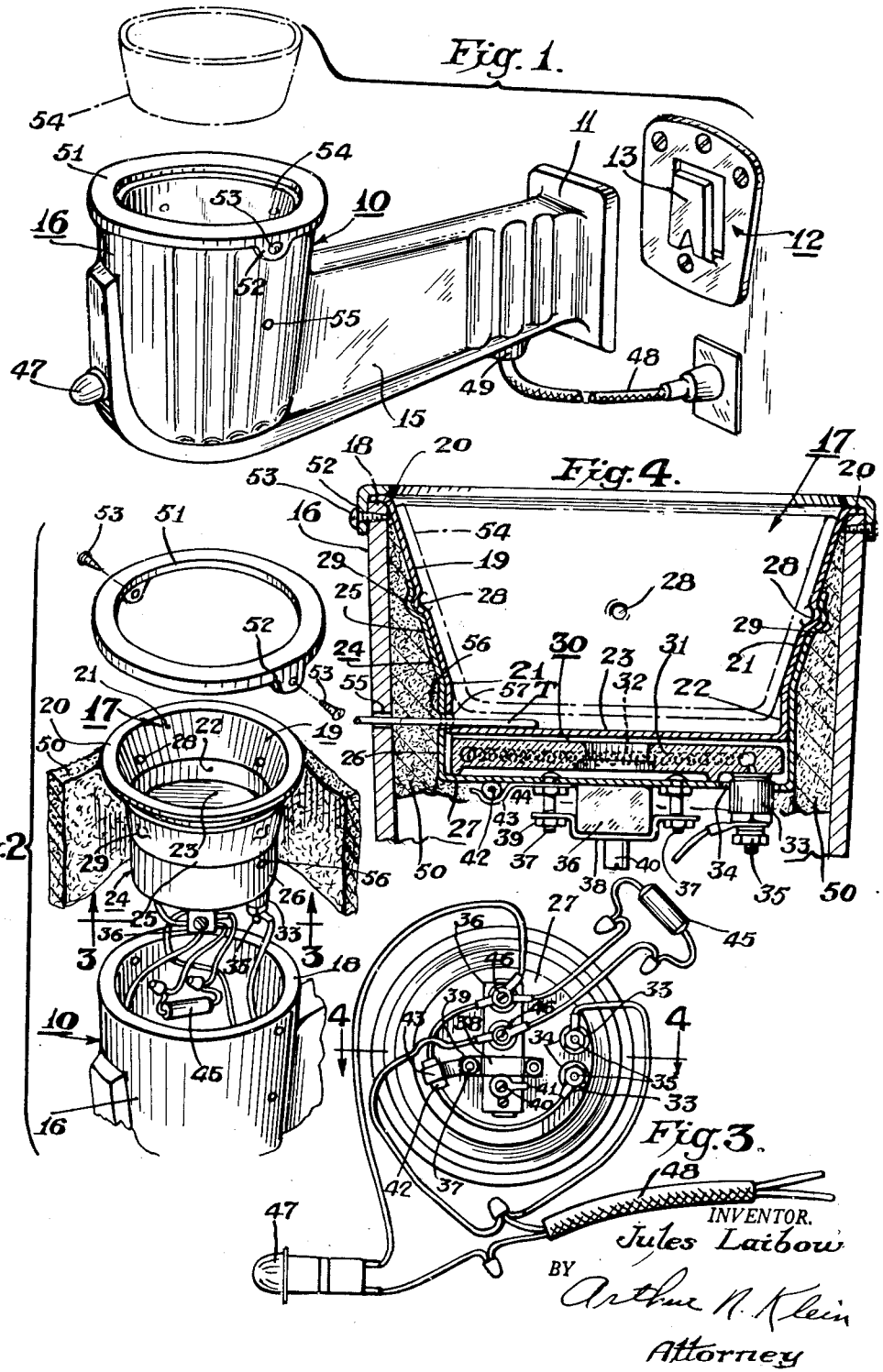
INVENTOR.
Jules Laibow
BY
Arthur N. Klein
Attorney Patented July 27, 1954

2,685,020

UNITED STATES PATENT OFFICE 2,685,020

INSECTICIDE VAPORIZER

Jules Laibow, Merchantville, N. J., assignor to Cardinal Chemical Corporation, Philadelphia, Pa., a corporation of Pennsylvania Application July 28, 1952, Serial No. 301,206

4 Claims. (Cl. 219—44)

The present invention relates generally to vaporizers for insecticides and the like and it relates more particularly to insecticide-vaporizers wherein a thermostatically-controlled electrical heating element maintains the temperature within a given range calculated to cause vaporization of the insecticide at a predetermined rate.

An object of the present invention is to provide a new and improved vaporizer for insecticides and the like. Another object of the present invention is to provide a novel insecticide-vaporizer which is simple and easy to manufacture, relatively inexpensive and yet accurate and dependable in operation, and so constructed that the individual parts and elements which are likely to fail upon prolonged use or through accident can be readily removed and replaced.

Other objects and advantages of the present invention are apparent in the following detailed description, appended claims and accompanying drawings.

It has been known for many years that rooms can be kept free of flies, mosquitos and other insects, without harmful effects upon humans or domestic animals, by spraying or vaporizing therein such insecticides as DDT and lindane (which is the gamma isomer of hexachlorocyclohexane). It has also long been known that a particularly effective way to vaporize these insecticides is to heat them at relatively moderate temperatures so as to cause the materials, which are relatively non-volatile solids at room temperature, to vaporize gradually in the form of an aerosol, thereby giving sufficiently high concentrations in the air to be lethal to insects while being harmless to humans and animals and without contamination of foods being stored, prepared or served in the room.

In my co-pending application Serial No. 232,539, filed June 20, 1951, now Patent No. 2,616,024, I have shown one type of insecticide-vaporizer which has proven effective in the controlled vaporization of these aerosol-type insecticides.

According to the present invention, I have perfected a further-improved electrically-operated vaporizer for insecticides and the like, wherein the structure has been simplified for greater economy and ease of assembly and, at the same time, has been made more dependable and effective in operation.

For the purpose of illustrating the invention, there is shown and described herein one embodiment which is presently preferred and which has been found in practice to give satisfactory results, it being understood, however, that the invention is not limited to the precise arrangements and instrumentalities disclosed.

Referring to the accompanying drawings in which like reference characters indicate like parts throughout:

Figure 1 is a perspective view of one embodiment of the present invention; the insecticide-containing cup or dish being shown in removed position.

Figure 2 is a fragmentary perspective view of the embodiment of Figure 1, with the major parts shown in exploded relationship.

Figure 3 is a more or less schematic elevational view taken along the line 3—3 of Figure 2 showing the appearance of the underside of the heating unit.

Figure 4 is a vertical cross-sectional view taken generally along the line 4—4 of Figure 3.

According to one embodiment of the present invention, shown generally in Figure 1, I may provide a more or less integrally formed housing of metal or the like, indicated generally by the reference character 10 and containing various features of ornamentation which are the subject of my Design Letters Patent D. 164,242, granted August 14, 1951.

The housing 10 includes a generally flat end-portion 11 which is adapted to be mounted upon a wall or other vertical supporting surface in any suitable manner, as for example by means of a wall-plate 12 having an upwardly directed and tapered tongue 13 of trapezoidal cross-section adapted to make detachable engagement with a correspondingly shaped undercut groove formed in the end-portion 11, as more fully described in my co-pending application Serial No. 232,539.

The housing 10 also includes a hollow arm 15 which extends generally horizontally from the end-portion 11 and a hollow, open-top, downwardly-tapered bowl 16, formed at the outer end of, and communicating with the arm 15.

Disposed within the bowl 16 is a heating-unit indicated generally by the reference character 17, the heating-unit being supported upon the upper peripheral rim 18 of the bowl 16 in a manner to be more fully described hereinbelow.

The heating-unit 17 includes an upper one-piece metal cup 19 having an uppermost outwardly-directed peripheral flange 20 which is adapted to rest upon, and receive support from the rim 18, as shown particularly in Figure 4. Extending downward from the flange 20 is a downwardly-tapered conical portion 21, at the lower end of which is provided a relatively short generally cylindrical portion 22, which terminates in a flat circular bottom wall 23.

The heating-unit 17 also includes a lower cup 24 integrally formed of metal or the like having an upper downwardly-tapered conical portion 25, a lower generally cylindrical portion 26 and a flat circular bottom wall 27.

The upper cup 19 is adapted to fit into the lower cup 24 in partially nested relationship therewith, the lower part of the conical portion 21 of the cup 19 fitting snugly within the conical portion 25 of the cup 24 and the cylindrical portion 22 of the cup 19 fitting snugly within the upper part of the cylindrical portion 26 of the cup 24, as shown particularly in Figure 4.

The two cups are locked together in this partially nested relationship in any suitable manner, as for example by punching a plurality (for example 4) of small dimples on the inner surface of the conical portion 21 so as to form small outwardly-directed locking projections 28 and 29 on the portions 21 and 25 respectively.

As indicated in Figure 4, the bottom wall 23 of the upper cup 19 terminates somewhat above the bottom wall 27 of the lower cup 24 so as to provide a generally enclosed cylindrical compartment 30 within the lower part of the cylindrical portion 26 intermediate the two walls 23 and 27.

Disposed within the compartment 30 is a relatively thin centrally apertured cylindrical ceramic heating-element 31 having a helical heating-coil 32 embedded therewithin. The heating-element 31 is provided with a pair of adjoining downwardly-directed projections 33 which extend through suitable openings 34 in the bottom wall 27 and carry the terminal posts 35 of the heating-coil 32.

Fastened to the underside of the bottom wall 27 in any suitable manner, is a thermostat 36, of conventional construction. The thermostat 36 is shown as being held in place by a pair of spaced bolts 37 extending through the wall 27 on opposite sides of the thermostat and carrying a cross-piece 38 passing underneath the thermostat and having openings at its ends to fit over the ends of the bolts and to be secured thereto by nuts 39, as indicated particularly in Figures 3 and 4.

The thermostat 36 is provided with an adjusting screw 40 which can be rotated to change the setting of the thermostat. Where the vaporizer is intended to be used with a particular insecticide, the adjusting screw 40 can be pre-set to give the desired optimum temperature and can then be locked at that setting by making a soldered connection between the housing of the thermostat and a locking-collar 41 carried by the adjusting screw. This minimizes the possibility of excessive or inadequate heating temperatures, resulting from tampering or the like, and, at the same time, permits re-adjustment (by simply melting the solder) if desired.

Also secured to the underside of the bottom wall 27 in any suitable manner is a thermal fuse 42 which protects against excessively high temperatures. In the drawings, the thermal fuse 42 is shown as being held in place by a spring clamp 43 mounted on one of the bolts 37 and held tightly against the wall 27 by a nut 44.

A condenser 45 is connected across the terminals 46 of the thermostat 36 to eliminate sparking and radio interference.

Mounted at the front of the housing 10 is a signal lamp 47 which is connected in series with the thermostat so that it is lit when the circuit is closed. Thus, it is possible to tell, at a glance, whether or not the vaporizer is in operation.

The vaporizer is provided with a conventional electric-cord 48 which can be plugged into any electrical outlet, as indicated in Figure 1, and which passes into the arm 15 through a bushing 49 provided at the bottom of the arm, adjacent the end plate 11. The electric cord 48 extends through the arm 15 and into the lower end of the bowl 16, at which point leads run from the individual wires of the electric cord to the terminals of the thermostat and the heating-coil as indicated more or less schematically in Figure 3. As shown in Figure 3, the thermal fuse 42 is connected in series between the thermostat 36 and the heating-coil 32 so that excessive temperature will blow out the fuse and break the circuit, shutting off the vaporizer until the thermostat setting is corrected and a new fuse installed.

A flexible strip 50 of fibre glass or other suitable heat-insulating material surrounds the heating-unit 17, within the bowl 16, so as to reduce heat-loss.

A peripheral lid or collar 51 having an outer downturned annular flange 52 overlies and encloses the flange 20 and the rim 18, the collar 51 being fastened to the upper portion of the bowl 16 by a plurality (for example, two) of circumferentially-distributed screws 53 and thereby serves to maintain the heating unit snugly in place within the bowl, as indicated particularly in Figures 1 and 4.

When the screws 53 are removed, the collar 51 can be taken off and the heating-unit 17 can be lifted up and out of the bowl 16, as indicated in Figure 2, so as to expose the thermostat, the condenser and the thermal fuse for adjustment and/or replacement.

A cup-shaped dish 54 of heat-resistant glass or the like is adapted to be positioned within the upper cup 19 of the heating-unit 17, as indicated in Figure 4, and to receive the insecticide intended to be heated and vaporized. As indicated in Figure 1, the dish 54 is somewhat smaller than the central opening of the collar 51, so that the dish can readily be removed for refilling or cleaning or replacement, without disconnecting the collar.

The dish 54 is preferably generally frusto-conical and is so dimensioned that it fits snugly within, and is supported by, the conical portion 21 of the metal cup 19, in the position shown in Figure 4; that is, with its bottom spaced slightly above the bottom wall 23 of the metal cup 19.

Aligned openings 55, 56 and 57 are formed in the bowl 16, the cylindrical portion 26 and the cylindrical portion 22, respectively, to permit insertion of a thermometer T into the last-mentioned clearance intermediate the bottom of the dish 54 and the bottom wall 23, to permit reading of the temperature directly below the heated insecticide, during operation of the vaporizer. In this way, it is possible periodically to check the operation of the vaporizer, so as to make sure that the thermostat is working properly.

From the foregoing, it is apparent that the novel vaporizer of the present invention can be quickly, easily and inexpensively manufactured of readily available materials and elements.

Thus, the housing may be formed inexpensively from light-weight aluminum alloy or like material, in any suitable manner, as for example by die-casting left and right longitudinal half-sections and welding them together into an integral unit. The cups 19 and 24 can be inexpensively formed from aluminum or the like by stamping them out of sheet material or in any other appropriate manner; and can be inter-connected by a simple punching operation, as described above.

The dish 54, the ceramic heating-element, the thermostat, the thermal fuse, the condenser and the signal lamp can all be standard elements, purchasable on the open market at minimum cost.

The assembling of these units into the completed vaporizer requires a minimum of time and labor due to the readily accessible position of the several parts.

As described above, readjustment or replacement of any of the individual parts is a simple operation which does not require any great degree of skill or any special tools.

The present invention may be embodied in other specific forms and, accordingly, the present embodiment is to be considered merely as illustrative and not restrictive, reference being made to the appended claims, rather than to the foregoing description, as indicating the scope of the invention.

Having thus described my invention, I claim as new and desire to protect by Letters Patent:

1. In a vaporizer for insecticides or the like, a housing having a generally upright open-top bowl, and a generally cup-shaped vaporizing-unit, removably mounted within the upper portion of said bowl, said vaporizing-unit including a pair of cup-shaped members of heat-conducting sheet-metal or the like having downwardly-tapered walls disposed in juxtaposed snugly-fitting relationship, said cup-shaped members being fitted together in partially-nested relationship with a generally enclosed compartment formed intermediate the vertically-spaced bottoms thereof, an electrical heating element comprising a self-contained thin cylindrical ceramic member disposed within said compartment and having insulated terminal posts extending downward through openings in the bottom wall of the vaporizing-unit to facilitate the making of electrical connections to the heating element.

2. A construction according to claim 1, wherein an outwardly-directed annular flange is formed on the top edge of the upper cup-shaped member, said flange extending over and resting upon the rim of the bowl, and wherein a separate collar is detachably connected at the top of the bowl in overlying relationship to said annular flange.

3. A construction according to claim 2, wherein the downwardly-tapered walls are provided with a plurality of circumferentially-distributed pairs of nested radial projections or dimples serving to lock the two cup-shaped members together.

4. A construction according to claim 3, wherein a thermostat is mounted on the underside of the vaporizing-unit and is operatively connected within the electrical circuit to the heating element so as to regulate the temperature of the vaporizing-unit and wherein a signal lamp is mounted in the housing and is visible from the exterior thereof, said signal lamp being connected in series with the heating element so as to provide visual indication that the vaporizer is in operation.

References Cited in the file of this patent
UNITED STATES PATENTS

| Number | Name | Date |
| --- | --- | --- |
| 1,713,249 | Abbott | May 14, 1929 |
| 2,066,476 | Lacy | Jan. 5, 1937 |
| 2,314,467 | Tubbs | Mar. 23, 1943 |
| 2,471,260 | Chapman | May 24, 1949 |
| 2,540,095 | Buehler | Feb. 6, 1951 |
| 2,541,637 | Christopher et al. | Feb. 13, 1951 |
| 2,616,024 | Laibow | Oct. 28, 1952 |